Patented Jan. 4, 1949

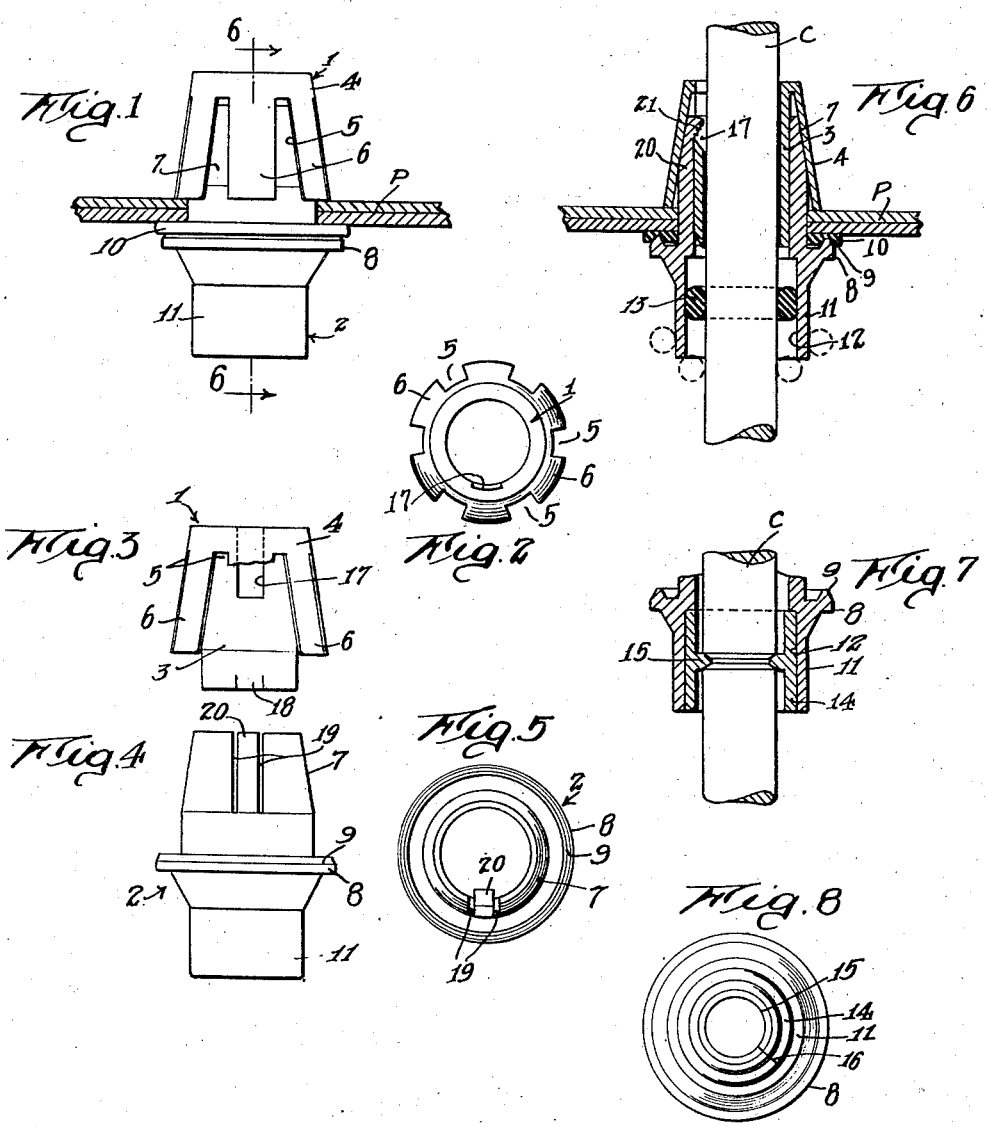

2,457,983

UNITED STATES PATENT OFFICE 2,457,983

PRESSURE-TIGHT GROMMET

Jan de Swart, Los Angeles, Calif., assignor, by mesne assignments, to Shellmar Products Corporation, Mount Vernon, Ohio, a corporation of Delaware Application December 12, 1944, Serial No. 567,862

15 Claims. (Cl. 285—6.5)

My invention relates to pressure-tight grommets, and among the objects of my invention are:

First, to provide a grommet which is particularly suited for manufacture from plastic.

Second, to provide a grommet which is an improvement of a conventional grommet, in that provision is made to effect a fluid-tight seal around the cable or pipe threaded through the grommet and the partition in which it is mounted.

Third, to provide a grommet of this character which incorporates a novel latching means to prevent separation of the components of the grommet once they are assembled.

Fourth, to provide a grommet which may serve also as a fastening means or hollow rivet for securing several plates together.

With the above and other objects in view as may appear hereinafter, reference is directed to the accompanying drawings, in which:

Fig. 1 is a side view of my pressure-tight grommet shown secured in a partition, the partition being shown fragmentarily.

Fig. 2 is an end view of the retainer element of the grommet.

Fig. 3 is a side view thereof with one of the abutment tongues broken away to show the latching slot.

Fig. 4 is an end view of the wedging sleeve element of the grommet.

Fig. 5 is a side view thereof and positioned in alignment with Fig. 3 to illustrate the manner in which the two elements are assembled.

Fig. 6 is a longitudinal sectional view through 6—6 of Fig. 1, showing a cable in position within the grommet and showing one form of sealing means between the grommet and the cable.

Fig. 7 is a fragmentary sectional view similar to Fig. 6, showing a modified form of sealing means between the cable and grommet.

Fig. 8 is an end view of the wedging element and sealing means shown in Fig. 7, with the cable omitted.

My invention comprises essentially a retainer element 1 and a wedging element 2, which are adapted to be fitted through a hole in a partition P or other member, and caused to clamp the partition around the margins of said opening.

The retainer element 1 includes a body element in the form of a sleeve or tubular member 3 of uniform diameter. The sleeve 3 is provided with a frusto-conical skirt 4 which is secured to or molded integrally with the sleeve at one end thereof. The skirt 4 is provided with axially extending slots 5 forming tongues 6 the extremities of which are yieldable radially so that the retainer element with its skirt 4 may be inserted through an opening in a partition or the like and the tongues 6 spread so as to bear against the margins of the opening.

The wedging element 2 is likewise tubular in form and is provided with a tapered or wedging end portion 7 which is adapted to fit through the opening in the partition P and slide between the sleeve 3 and the skirt 4 to spread the tongues 6.

The wedging element 2 is provided with an external flange 8 which is adapted to bear against the partition P as the retainer and wedging elements are telescoped, and thereby coact with the extremities of the tongues 6 to clamp the partition P. The external flange 8 is preferably provided with a ridge 9 directed toward the partition P, and an external packing ring 10 is interposed between the partition P and flange 8 to form a fluid-tight seal.

The wedging element 2 is provided with a tubular extension 11 having a counterbore 12. The retainer and wedging elements are adapted to receive a cable or conduit or other cylindrical member C. For convenience, this member will be referred to as a conduit, although it may, in fact, be a single or multiple conductor cable or a pipe for fluids. A clearance space is formed between the conduit C and the counterbore 12. This space is adapted to receive an internal packing ring 13. The packing ring 13 is normally circular in cross-section and somewhat larger than the space between the counterbore and the cable, so that the walls of the packing ring are compressed radially when the packing ring is forced into the counterbore around the conduit. The packing ring is preferably formed of rubber or so-called synthetic rubber and is sufficiently stretchable that it may be initially placed over the tubular extension 11 as indicated by dotted lines in Fig. 6. After the conduit has been positioned, the packing ring 13 is slipped from the tubular extension to the second dotted line position shown in Fig. 6, and then forced into the solid line position. While the packing ring may be forced tightly against the shoulder forming the inner end of the counterbore 12, it is not necessary that this be done; instead, the packing ring may occupy an intermediate position and be free to roll to a limited extent and permit nominal relative movement between the conduit and the grommet.

The arrangement of the internal packing ring described above is best suited for members having metal surfaces, or at least smooth, hard surfaces. If the conduit is rubber covered or otherwise provided with a yieldable covering, an alternative form of packing may be employed as shown in Fig. 7. A packing collar 14 is slidable in the counterbore 12 preferably abutting the shoulder at the inner end of the counterbore and forming a seal. The packing collar 14 is provided with an internal flange 15 having an opening smaller than the conduit, so that it may press into the surface thereof and form a seal. The packing collar 14 is preferably split longitudinally, either axially as indicated at 16, or diagonally so that it may be spread apart and slipped over the conduit.

The various parts of my grommet with the exception of the packing rings 10 and 13 shown in Fig. 6, are preferably formed of molded plastic. Such material affords an inherently high frictional contact between the wedging portion 7 and tongues 6 so that the retainer element and wedging element tend to maintain their positions when the parts of the grommet are assembled in place. The packing collar 14 is likewise preferably formed of plastic, and in order to insure complete sealing, a solvent may be applied to the confronting faces of the slit 16; in fact, to the entire surface of the packing collar so that the slit is sealed and a bond is formed between the packing collar and the tubular extension when the parts are assembled. It is also possible and feasible to apply the solvent to the wedging porton 7 immediately before insertion in the frustoconical skirt 4.

It is not always desirable, however, to apply a solvent between the retainer and wedging elements; instead, a latching means may be incorporated in these elements. For this purpose the sleeve 3 of the retainer element 1, is provided with a longitudinally extending slot 17 located under one of the tongues 6, or if desired, within one of the spaces between the tongues. The slot 17 terminates in an undercut edge and the extremity of the sleeve 3 in alignment with the slot 17 is provided with a beveled portion 18. The wedging portion 7 is provided with a pair of parallel slits 19 which form therebetween a latch tongue 20 adapted to ride over the beveled portion 18 and enter the slot 17 to latch with the undercut edge thereof. The latch 20 may be provided with a series of steps 21 so that the grommet may be secured to partitions of various thicknesses.

With either construction shown, my grommet affords a seal between the cable and partition which is not only liquid-tight but air or gas-tight, and capable of maintaining its seal even though a substantial pressure differential exists between the sides of the partition.

Many other embodiments of the invention may be resorted to without departing from the spirit of the invention.

I claim:

1. A pressure-tight grommet, comprising: an element having a plurality of expansible tongues; a conduit; a tubular member adapted to expand said tongues and having an abutment flange adapted to co-act with said tongues to secure a plate therebetween; means adapted to secure said element and said tubular member together; a sealing member interposed between said plate and flange; and a sealing means interposed between said tubular member and conduit.

2. A pressure-tight grommet for insertion in an opening in a plate, comprising: a pair of relatively slidable telescoping tubular elements adapted to receive a conduit; shoulder means on one of said elements and cooperating radially expansible means on the other of said tubular elements for clamping the opposite margins of the opening in the plate in which said tubular elements are inserted; means on said elements for latching them in telescoping relation; a first sealing means between one of the tubular elements and said plate; and a second sealing means between said tubular element and said conduit.

3. A pressure-tight grommet, comprising: a tubular element adapted to be inserted through an opening in a plate; means for latching attachment to one end of said tubular element having radially expansible portions engageable with one side of said plate; a flange on said tubular element coacting with said radially expansible portions to clamp said plate; a sealing member interposed between said flange and plate; and a sealing means interposed between said tubular element and said conduit.

4. A construction as set forth in claim 3, wherein said tubular element defines an internal cylindrical surface spaced from said conduit and said sealing means is in the form of an annulus of yieldable material radially compressed between said cylindrical surface and said conduit and in rolling engagement therewith to permit limited axial movement of said conduit relative to said tubular element.

5. A construction as set forth in claim 3, wherein said sealing means comprises a longitudinally split collar fitting within said tubular element and having an internal flange adapted to press into the surface of said conduit.

6. A fastening device comprising: a body element; a radially flexible skirt attached to and overlying said body element; a sleeve adapted to fit over said body element and including a wedging portion for radially spreading said skirt, and an abutment shoulder adapted to coact with said skirt to clamp a plate through which said sleeve extends; an axially extending latch arm formed in a wall of said sleeve; and means on said body engageable by said latch arm to interlock said body element and sleeve.

7. A construction as set forth in claim 6, wherein said latch arm is provided with a plurality of latch shoulders sequentially engageable with said means as said sleeve is moved onto said body element.

8. A construction as set forth in claim 6, wherein said body element is tubular to receive a conduit; a sealing means is interposed between said sleeve and conduit and a sealing member is interposed between said abutment and said plate.

9. A pressure tight grommet adapted to be secured in an opening in a plate, comprising: a pair of telescoping tubular elements adapted to receive a conduit; one of said tubular elements having a circumferential abutment; expansible means on the other of said tubular elements engageable by said abutment carrying tubular element and cooperating with said abutment thereon for clamping the opposite margins of the opening in the plate in which said tubular elements are to be secured; a latch means including an axially directed tongue on one of said elements and a keeper on the other of said elements for relatively securing said elements in their clamping position; means for effecting a seal between at least one of said tubular elements and said plate; and a sealing means interposed between said tubular element and said conduit.

10. A construction as set forth in claim 9, wherein said tubular element defines an internal cylindrical surface spaced from said conduit and said sealing means is in the form of an annulus of yieldable material radially compressed between said cylindrical surface and said conduit and in rolling engagement therewith to permit limited axial movement of said conduit relative to said tubular element.

11. A construction as set forth in claim 9, wherein said sealing means comprises a longitudinally split collar fitting within said tubular element and having an internal flange adapted to press into the surface of said conduit.

12. A pressure tight grommet as set forth in claim 1 wherein said tubular member is provided with an axially extending latch arm in the wall thereof, and means on said first mentioned element engageable by said latch arm to interlock said first mentioned element and said tubular member.

13. A grommet adapted to be secured in an opening in a plate, comprising an inner tubular element, a relatively stiff radially expansible skirt attached to said tubular element in overlying relation, a cooperating outer tubular element adapted to telescope said inner tubular element and expand said skirt, an abutment flange on said outer tubular element cooperating with said expansible skirt to clamp the plate at the opposite margins of the opening in the plate, and cooperating interengaging latch means on said tubular elements for interlocking engagement.

14. A grommet as set forth in claim 13 wherein said latch engaging means comprises an axially extending latch arm on said outer tubular element, and means on said inner tubular element for interlocking engagement with said latch arm.

15. A grommet adapted to be secured in an opening in a plate, comprising an inner tubular element, a relatively stiff radially expansible skirt attached to said tubular element in overlying relation, a cooperating outer tubular element adapted to telescope said inner tubular element and expand said skirt, an abutment flange on said outer tubular element cooperating with said expansible skirt to clamp the plate on the opposite margins of the opening therein, said inner tubular element being provided with an axially extending slot, and an axially extending latch arm on said outer tubular element having means for selective engagement in said slot to provide an adjustable interlocking connection between the tubular elements.

JAN DE SWART.

REFERENCES CITED

The following references are of record in the file of this patent:

UNITED STATES PATENTS

| Number | Name | Date |
| --- | --- | --- |
| 207,871 | Horton | Sept. 10, 1878 |
| 785,106 | Jones | Mar. 21, 1905 |
| 1,063,926 | Schuermann | June 3, 1913 |
| 1,805,155 | Weeks | May 12, 1931 |
| 2,255,971 | Hall | Sept. 16, 1941 |
| 2,308,641 | Brushaber | Jan. 19, 1943 |
| 2,329,000 | Rembort | Sept. 7, 1943 |